Nov. 30, 1954 E. J. KLEIN ET AL 2,695,630
COLLAPSIBLE EXTENSION FOR AUTOMOBILE EXHAUST PIPES
Filed Oct. 10, 1952 2 Sheets-Sheet 1
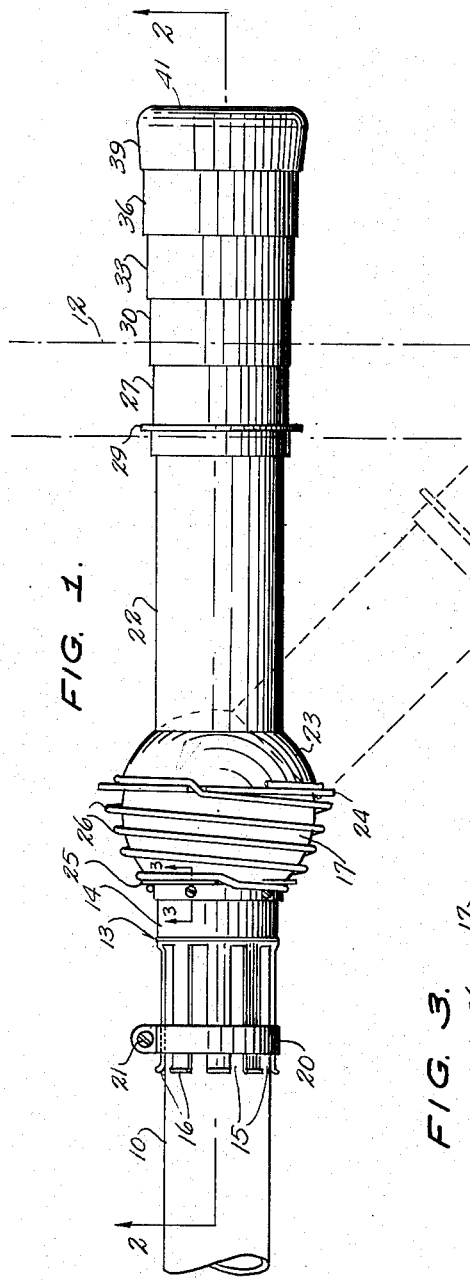
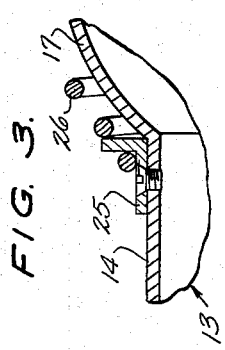
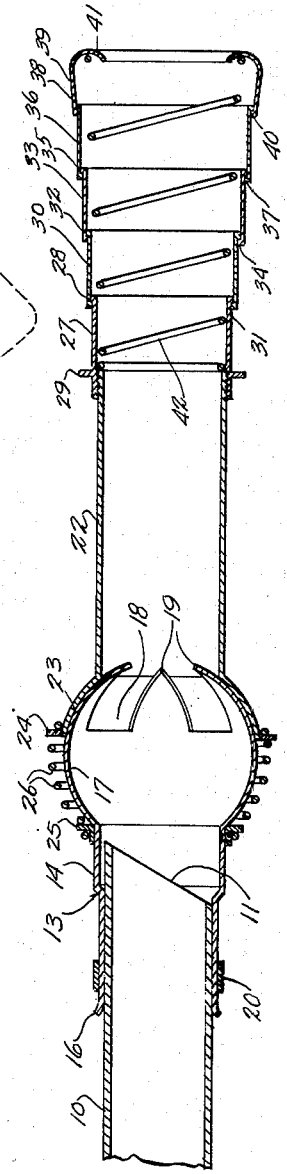
INVENTORS
EDWIN J. KLEIN,
GORDON E. KLEIN,
BY
McMorrow, Berman + Davidson
ATTORNEYS.

Nov. 30, 1954     E. J. KLEIN ET AL     2,695,630
COLLAPSIBLE EXTENSION FOR AUTOMOBILE EXHAUST PIPES
Filed Oct. 10, 1952     2 Sheets-Sheet 2
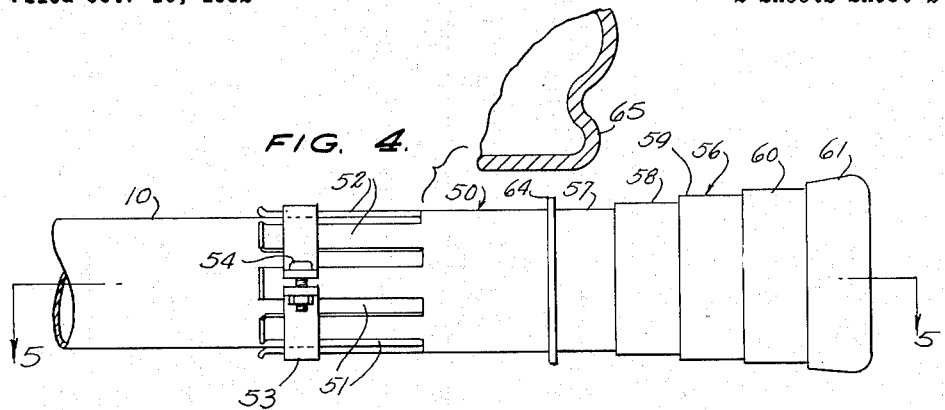
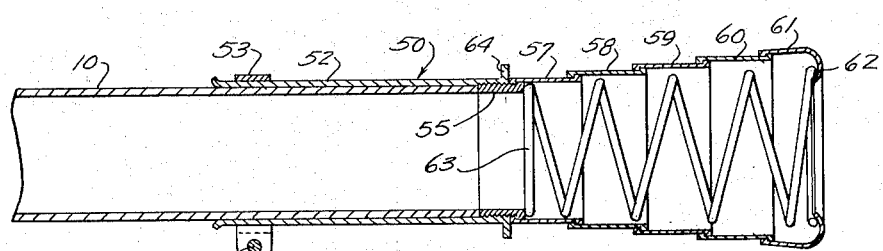
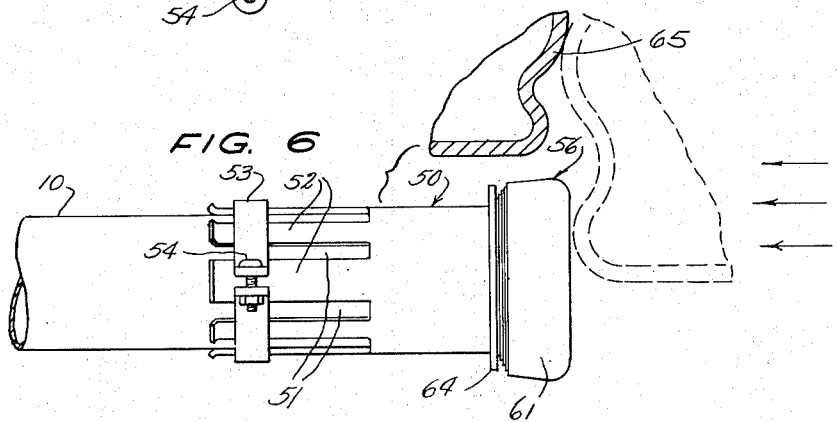
INVENTORS
EDWIN J. KLEIN,
GORDON E. KLEIN,
BY
McMorrow, Berman + Davidson
ATTORNEYS United States Patent Office 2,695,630
Patented Nov. 30, 1954

2,695,630

COLLAPSIBLE EXTENSION FOR AUTOMOBILE EXHAUST PIPES

Edwin J. Klein and Gordon E. Klein, Honolulu, Territory of Hawaii

Application October 10, 1952, Serial No. 314,124

2 Claims. (Cl. 138—46.5)

This invention relates to collapsible extensions for automobile exhaust pipes and more particularly to an extension which carries the exhaust pipe to a location rearwardly of the rear bumper of the automobile and is movable to a position flush with or forwardly of the rear bumper in case of impact.

It is among the objects of the invention to provide an improved attachment which can be mounted on an automobile exhaust pipe and will extend the exhaust pipe rearwardly to a location spaced rearwardly from the rear bumper of the associated automobile so that the exhaust gases will be discharged rearwardly of and will not discolor or otherwise damage the rear bumper or the rear portion of the automobile; which is movable on impact to a position flush with or even somewhat ahead of the associated rear bumper and is resiliently returned to its original position; which requires no material modification of the exhaust pipe for its installation; and which is simple and durable in construction, economical to manufacture, and neat and attractive in appearance.

Other objects and advantages will become apparent from a consideration of the following description and the appended claims in conjunction with the accompanying drawings wherein:

Figure 1 is a top plan view of an exhaust pipe extending attachment illustrative of the invention with a portion of the associated exhaust pipe fragmentarily illustrated;

Figure 2 is a longitudinal cross sectional view on the line 2—2 of Figure 1;

Figure 3 is a fragmentary cross sectional view on an enlarged scale of a portion of the structure illustrated in Figure 2;

Figure 4 is a side elevational view of a somewhat modified form of exhaust pipe extending attachment, portions of the associated exhaust pipe and rear bumper being fragmentarily illustrated;

Figure 5 is a longitudinal cross sectional view on the line 5—5 of Figure 4; and Figure 6 is a cross sectional view similar to Figure 5 but showing the attachment in collapsed condition as the result of impact.

With continued reference to the drawings and particularly to Figures 1, 2 and 3, the numeral 10 designates an automobile tail or exhaust pipe, the rear portion only being illustrated and terminating at the rear end 11, and the line 12 indicates the limiting rear position of the rear bumper of the associated automobile.

The exhaust pipe in most automobiles terminates under or somewhat ahead of the rear bumper so that it will not be damaged or loosened if the automobile is accidently backed against a solid obstruction or is subjected to collision from the rear. While this arrangement protects the exhaust pipe, it causes the exhaust gas to be discharged under or ahead of the rear bumper where the exhaust gas discolors or otherwise damages the rear bumper and, in some cases the rear portion of the automobile body.

The attachment of the present invention is secured to and extends rearwardly of the exhaust pipe carrying the exhaust gas to a location rearwardly of the rear bumper before discharge. It comprises a socket, generally indicated at 13 including a band 14 of cylindrical shape disposed intermediate the length of the socket and having an internal diameter slightly greater than the external diameter of the associated exhaust pipe, a sleeve structure extending from one end of the band 14 and receiving the rear end portion of the associated exhaust pipe, this sleeve structure being divided by longitudinally extending notches 15 spaced apart at substantially equal angular intervals therearound into a series of resilient fingers 16 disposed in spaced apart and substantially parallel relationship to each other, and a partly spherical structure 17 extending from the other end of the band 14. The partly spherical socket structure 17 extends from the corresponding end of the band and is provided at its end remote from the band with an opening 18 which is spaced in a direction away from the band from a diametrical plane of the partly spherical formation perpendicular to the longitudinal center line or axis of the band 14 and sleeve formation provided by the resilient fingers 16. Curved fingers 19 extend from the edge of the opening 18 to locations adjacent to but spaced from the center of the opening and these fingers are longitudinally curved to the contour of the partly spherical structure and are tapered in width from their proximal to their distal ends. They are also spaced apart at substantially equal angular intervals around the edge of the opening 18, four fingers 19 spaced apart substantially ninety degrees over centers having been found to provide entirely satisfactory results.

A split clamp band 20 surrounds the resilient fingers 16 and is provided with a tightening screw 21 for clamping the fingers securely onto the exhaust pipe 10. The exhaust pipe terminates within the band 14 and is cut off, if necessary, to position the attachment so that, when the attachment is in fully expanded condition, its rear end is disposed from four to five inches rearwardly of the rearmost limit of the adjacent portion of the rear bumper.

A tube 22 extends from the portion of the structure 17 having the opening 18 therein in surrounding relationship to this opening and has on its end adjacent the structure 17 a formation 23 of partly spherical shape and of less than hemispherical extent receiving the portion of the structure 17 surrounding the opening 18 and having at its end remote from the tube 22 an outwardly extending, annular flange 24.

A ring 25 surrounds and is secured to the band 14 at the juncture of this band with the socket structure 17 and provides an outwardly extending annular flange spaced from and opposed to the flange 24. The partly spherical structures 17 and 23 provide a ball or universal joint connection between the socket 13 and the tube 22 and a coiled spring 26 surrounds the structure 17 in spaced relationship thereto and is secured at one end to the ring 25 and at its other end to the flange 24. This spring holds the structures 17 and 23 together with the tube 22 substantially in longitudinal alignment with the socket 13 and provides resiliently resisted freedom of angular movement in different planes of the tube 22 relative to the socket 13 about the center of the structure 17.

At its end remote from the structure 23 the tube 22 is provided with internal screw threads and an internally screw threaded sleeve 27 is threaded at one end onto the screw threaded end portion of the tube 22 and has at its other end an external annular bead or flange 28. An annular flange 29 surrounds and projects outwardly from the sleeve 27 near the end of this sleeve receiving the tube 22 to provide a stop for a purpose to be presently described.

A second sleeve 30 receives the sleeve 27 and has at its end nearest the tube 22 an internal annular bead or flange 31 which engages the external bead 28 on the sleeve 27 to restrain these two sleeves against longitudinal separation. The sleeve 30 has on its other end an external annular bead or flange 32 and a third sleeve 33 receives the sleeve 30 and has at its end nearest the tube 22 an internal bead or flange 34 which engages the external bead 32 on sleeve 30 to maintain sleeves 30 and 33 against longitudinal separation. At its other end the sleeve 33 has an external annular bead or flange 35.

A fourth sleeve 36 receives the sleeve 33 and has at its end nearest the tube 22 an internal annular bead or flange 37 which engages the external bead 35 on sleeve 33 to maintain the sleeves 33 and 36 against longitudinal separation. The sleeve 36 has on its other end an external annular bead or flange 38 and a fifth sleeve 39 receives the sleeve 36 and has at its end nearest the tube 22 an annular internal bead or flange 40 which engages the external bead on sleeve 36 to maintain the sleeves 36 and 39 against longitudinal separation. The sleeve 39 constitutes the terminal sleeve of the attachment and has at its end an inwardly extending annular flange 41 which surrounds an opening having a diameter at least as great as the internal diameter of the exhaust pipe 10.

The sleeves 27, 30, 33, 36 and 39 together constitute a collapsible telescopic structure secured to and extending rearwardly from the tube 22 and a coiled compression spring 42 is disposed in this telescopic structure and bears at one end against the adjacent or rear end of the tube 22 and at its other end against the internal flange 41 of the terminal sleeve 39 to resiliently maintain the telescopic structure in fully expanded condition while permitting it to shorten or collapse if subjected to pressure or impact at its rear end. The universal joint connection including the parts 17 and 23 permits the portion of the structure rearwardly of this connection to be swung sideways under the rear bumper if this rear portion is struck at either side.

A damaged telescopic structure may be replaced by threading the sleeve 27 of the damaged structure off of the tube 22 and threading the corresponding sleeve of a new structure onto the tube. When the spring 42 is not operatively positioned in the telescopic structure, as when the structure is detached from the tube 22, the stop flange 29 prevents the sleeves of the telescopic structure from passing through each other and the terminal flange 39.

The modified arrangement illustrated in Figures 4, 5 and 6 is substantially the same as that illustrated in Figures 1, 2 and 3 and described above except that in the modified arrangement the ball and socket or universal joint is omitted and the modified attachment is consequently much shorter than the attachment previously described.

In the modified arrangement a socket, generally indicated at 50, in the form of a cylindrical sleeve, receives the rear end portion of the exhaust pipe 10 and is provided with elongated notches 51 extending longitudinally from one end thereof at substantially equal angular intervals around and providing between them an annular series of resilient fingers 52 disposed in spaced apart and substantially parallel relationship to each other. A split clamp band 53 surrounds the fingers 52 and is provided with a clamping screw 54 for firmly clamping the socket 50 onto the exhaust pipe 10.

At its end remote from that to which the notches 51 open the socket sleeve is interiorly screw threaded and projects beyond the rear end of the exhaust pipe. A coupling sleeve or collar 55 is threaded partially into the screw threaded end of the socket sleeve 50 and a collapsible telescopic structure, generally indicated at 56 is threaded at one end onto the portion of the coupling sleeve 55 disposed outside of the socket sleeve 50 and projects longitudinally from the socket sleeve.

The telescopic structure 56, as illustrated, comprises five cylindrical rings or sleeves 57 to 61 inclusive of progressively increasing diameter in a direction away from the socket sleeve 50 and with each sleeve received in the adjacent sleeve remote from the socket sleeve and each intermediate sleeve having at its end adjacent the socket sleeve an internal annular flange or bead and at its end remote from the socket sleeve an external annular sleeve or bead engageable with the internal bead on the associated sleeve to maintain interconnected sleeves against longitudinal separation. The first terminal sleeve 57 has its end adjacent the socket 50 internally screw threaded to receive the coupling sleeve 55 and has an external annular bead at its other end and the last terminal sleeve 61 has an internal annular bead at its end nearest the socket 50 and has an internal annular flange 62 at its other end.

A coiled compression spring 63 is disposed in the telescopic structure 56 and bears at one end against the adjacent end of the coupling sleeve 55 and at its other end against the flange 62 to resiliently hold the telescopic structure in expanded condition. An external annular flange on the socket sleeve 50 adjacent the end of this sleeve receiving the coupling sleeve 55 serves as a stop to prevent separation of the telescopically associated sleeves 57 to 61 inclusive in the absence of the spring 63.

In this arrangement a new telescopic structure can be installed, if necessary, by threading a damaged structure off of the coupling sleeve 55 and threading a new telescopic structure onto the coupling sleeve.

In the modified arrangement the exhaust gases are discharged at a location spaced rearwardly of the rear bumper 65 when the telescopic structure is fully expanded, as illustrated in Figure 4 but the telescopic structure will collapse when subjected to impact or pressure, until the rear end of the terminal sleeve 61 is substantially flush with the rearward extent of the rear bumper, as illustrated in Figure 6.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an automobile exhaust pipe and rear bumper, an exhaust pipe extending attachment mounted at one end on said exhaust pipe and having its other end disposed rearwardly of said rear bumper and including a circumferentially adjustable exhaust pipe receiving socket, a longitudinally collapsible structure secured at one end to one end of said socket and extending longitudinally from the latter, and spring means carried by said longitudinally collapsible structure resiliently maintaining the latter in fully expanded condition, said longitudinally collapsible structure comprising telescopically connected sleeves increasing progressively in diameter in a direction away from said socket and each having means thereon at the ends thereof engaging with complementary means on the corresponding ends of the associated sleeves to maintain said sleeves against longitudinal separation by the force of said spring means.

2. In combination with an automobile exhaust pipe and rear bumper, an exhaust pipe extending attachment mounted at one end on said exhaust pipe and having its other end disposed rearwardly of said rear bumper and including a circumferentially adjustable exhaust pipe receiving socket, a longitudinally collapsible structure secured at one end to one end of said socket and extending longitudinally from the latter, spring means carried by said longitudinally collapsible structure resiliently maintaining the latter in fully expanded condition, interengaging formations of partly spherical shape on said socket and said longitudinally collapsible structure providing a universal joint connection between said socket and said structure, and spring means connected between said socket and said longitudinally collapsible structure resiliently maintaining said formations in engagement with each other and said longitudinally collapsible structure substantially in longitudinal alignment with said socket.

References Cited in the file of this patent

UNITED STATES PATENTS

| Number | Name | Date |
|---|---|---|
| 336,129 | McGahan | Feb. 16, 1886 |
| 568,042 | Rathburn | Sept. 22, 1896 |
| 1,554,317 | Worthing | Sept. 22, 1925 |
| 2,016,809 | Bystricky | Oct. 8, 1935 |
| 2,459,918 | Chester | Jan. 25, 1949 |
| 2,466,307 | Di Renna | Apr. 5, 1949 |
| 2,489,480 | Chester | Nov. 29, 1949 |
| 2,489,481 | Chester | Nov. 29, 1949 |
| 2,500,510 | Barnes | Mar. 14, 1950 |